United States Patent [19]

Brandstetter et al.

[11] 4,440,906

[45] Apr. 3, 1984

[54] THERMOPLASTIC MOLDING MATERIAL

[75] Inventors: Franz Brandstetter, Neustadt; Juergen Hambrecht, Neckargemuend; Adolf Echte, Ludwigshafen, all of Fed. Rep. of Germany

[73] Assignee: BASF Aktiengesellschaft, Ludwigshafen, Fed. Rep. of Germany

[21] Appl. No.: 337,404

[22] Filed: Jan. 6, 1982

[51] Int. Cl.³ .............................................. C08L 61/04
[52] U.S. Cl. .................................... 525/68; 525/261; 525/289; 525/905
[58] Field of Search .................. 525/68, 905, 261, 289

[56] References Cited

U.S. PATENT DOCUMENTS

| | | | |
|---|---|---|---|
| 3,383,435 | 5/1968 | Cizek | 525/68 |
| 3,787,532 | 1/1974 | Carmelite et al. | 525/68 |
| 4,128,602 | 5/1978 | Katchman et al. | 525/68 |
| 4,128,603 | 5/1978 | Katchman et al. | 525/68 |

FOREIGN PATENT DOCUMENTS

| | | |
|---|---|---|
| 1260135 | 2/1968 | Fed. Rep. of Germany . |
| 77-32800 | 8/1977 | Japan . |

*Primary Examiner*—J. Ziegler
*Attorney, Agent, or Firm*—Oblon, Fisher, Spivak, McClelland & Maier

[57] ABSTRACT

The use of tricyclodecenyl alcohol in place of other crosslinking agents for crosslinking the soft component of impact-resistant polystyrene based on a polystyrene-grafted poly(alkyl acrylate) improves the flow of mixtures of the said polystyrene with polyphenylene ethers.

2 Claims, No Drawings

THERMOPLASTIC MOLDING MATERIAL

The present invention relates to thermoplastic molding materials based on styrene polymers which have been made impact-resistant and on polyphenylene ethers.

Thermoplastic molding materials which are useful for the production of moldings and contain styrene polymers which have been made impact-resistant together with polyphenylene ethers are disclosed, for example, in U.S. Pat. Nos. 3,383,435, 4,128,602 and 4,128,603. The soft component in these is generally polybutadiene. In addition, thermoplastic molding materials which are useful for the production of moldings and which contain polyphenylene ethers and styrene polymers which have been made impact-resistant using, as the soft component, a polymer based on acrylic acid esters, have also been disclosed, for example in Japanese Laid-Open Application 77/32,800. These molding materials can be used to produce moldings which, compared to impact-resistant styrene polymers not mixed with polyphenylene ethers, exhibit better heat distortion resistance, while compared to molding materials comprising polyphenylene ethers and impact-resistant styrene polymers containing a soft component with a plurality of double bonds they exhibit improved aging resistance. The properties of such molding materials are generally satisfactory except that they have been found to have unfavorable flow characteristics.

It is an object of the present invention to provide thermoplastic molding materials, based on impact-resistant styrene polymers and polyphenylene ethers, which possess improved flow and give moldings having good aging resistance.

We have found that this object is achieved, according to the invention, by a thermoplastic molding material comprising a mixture of (a) a styrene polymer, having an intrinsic viscosity of from 40 to 140 ml/g, as the hard component, (b) a poly(alkyl acrylate), alkyl being of 2 to 8 carbon atoms, which is crosslinked, is grafted to the extent of 10–60% by weight with styrene and has a glass transition temperature of below 0° C., as the soft component, and (c) a polyphenylene ether with an average chain length corresponding to not less than 50 benzene nuclei, the weight ratio a:b being (95–40):(5–60) and the weight ratio (a+b):c being (5–90):(95–10), wherein the soft component (b) contains, as a crosslinking agent, from 0.5 to 20% by weight of tricyclodecenyl acrylate of the formula I

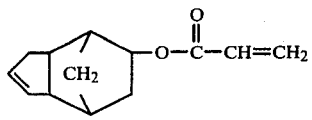

as copolymerized units.

For the purposes of the present invention, a molding material is a mixture which can be converted by thermoplastic processing methods, within a certain temperature range, to moldings or to rod, sheet or tube. The molding material may be in the form of granules or powder.

The impact-resistant styrene polymers used in the molding materials can be prepared by any suitable method, provided the above amount of tricyclodecenyl acrylate is used. Molding materials which contain a soft component which has been prepared in the presence of from 2 to 10% by weight, based on the soft component, of tricyclodecenyl acrylate are particularly suitable.

The thermoplastic molding materials can contain impact-resistant styrene polymers and polyphenylene ethers in virtually any ratio; for example, they can contain from 5 to 90% by weight of modified styrene polymer and from 95 to 10% by weight of polyphenylene ether. Particularly suitable molding materials for the production of moldings contain from 20 to 80% by weight of impact-resistant styrene polymers and from 80 to 20% by weight of polyphenylene ethers.

Suitable hard components are homopolymers and copolymers of styrene, nuclear-alkylated styrenes and side-chain-alkylated styrenes. Preferably, styrene alone is used.

The hard component can be prepared by conventional methods, for example by mass, solution, suspension or aqueous emulsion polymerization of styrene.

The hard component preferably has an intrinsic viscosity of from 40 to 140, especially from 80 to 120, ml/g. The intrinsic viscosity is determined by the method of DIN 53,726, using a solution of 0.5 g of the material in 100 ml of toluene.

The graft copolymer employed as the soft component according to the invention can be prepared by known methods in a conventional manner. The grafting base used is an acrylic ester polymer, crosslinked as described below and having a glass transition temperature of below 0° C. Preferably, the crosslinked polymer should have a glass transition temperature of below −20° C., in particular below −30° C. This glass transition temperature can be determined by, for example, the DSC method (K. H. Illers, Makromol. Chemie 127 (1969), 1). Alkyl acrylates, where alkyl is of 2 to 8 carbon atoms, preferably of 4 to 8 carbon atoms, are particularly suitable for the preparation of the acrylic ester polymers. Specific examples of particularly suitable alkyl acrylates are n-butyl acrylate and ethylhexyl acrylate. In preparing the acrylic ester polymer which serves as the grafting base, the alkyl acrylates can be employed individually or as a mixture with one another.

In order to obtain crosslinked acrylic ester polymers, such as are required as the grafting base for the preparation of the graft copolymers, the polymerization of the acrylic ester is, according to the invention, carried out in the presence of from 0.5 to 20% by weight, preferably from 2 to 10% by weight, based on total monomers employed to prepare the grafting base, of tricyclodecenyl acrylate (cf. German Pat. No. 1,260,135).

The graft copolymer employed according to the invention can be prepared by, for example, the method described in German Patent 1,260,135. In this method, the grafting base is first prepared by polymerizing the tricyclodecenyl acrylate with the comonomers, in aqueous emulsion in a conventional manner at from 20° to 100° C., preferably from 50° to 80° C. The conventional emulsifiers, for example alkali metal alkylsulfonates, alkylarylsulfonates, alkyl-sulfates or fatty alcohol-sulfonates, salts of higher fatty acids of 10 to 30 carbon atoms, or resin soaps, can be employed. The sodium alkylsulfonates and sodium salts of fatty acids of 10 to 18 carbon atoms are preferred. Advantageously, from 0.1 to 5% by weight, especially from 0.5 to 2% by weight, based on the monomers employed in preparing the grafting base, are used. In general, a water:monomer ratio of from 2:1 to 0.7:1 is employed. Polymerization initiators used in particular include the conventional persulfates, for example potassium persulfate, but redox systems can also be used. In general, the amount of initiator used is from 0.1 to 1% by weight, based on the monomers employed in preparing the grafting base. Other polymerization auxiliaries which can be employed include the conventional buffers, eg. sodium bicarbonate and sodium pyrophosphate, used to obtain a pH of, preferably, from 6 to 9, and from 0 to 3% by weight of a molecular weight regulator, eg. a mercaptan, terpene or dimeric α-methylstyrene. The precise polymerization conditions, in particular the type, feed rate and amount of emulsifier, are selected, within the above ranges, so that the resulting latex of the crosslinked acrylic ester polymer has a $d_{50}$ (mean particle diameter) of from about 0.05 to 0.15 μm, preferably from 0.06 to 0.12 μm.

To prepare the graft copolymer, styrene is next polymerized, in a second step, in the presence of the acrylic ester polymer latex obtained above. Advantageously, this graft copolymerization of styrene onto the acrylic ester polymer grafting base is also carried out in aqueous emulsion under the conventional conditions mentioned above. In particular, the graft copolymerization can be carried out in the same system as the emulsion polymerization by which the grafting base was prepared, but, where necessary, with addition of further emulsifier and initiator. The styrene to be grafted onto the polymer can be added to the reaction mixture as a single shot, or in several stages, or gradually during the polymerization. The graft copolymerization of styrene in the presence of the crosslinked acrylic ester polymer is conducted in such a way as to give a degree of grafting of from 10 to 60% by weight, preferably from 30 to 40% by weight, in the resulting graft copolymer. Since the grafting yield in this graft copolymerization is not 100%, the amount of styrene to be employed is somewhat greater than that which corresponds to the desired degree of grafting. The control of the grafting yield of the graft copolymerization and accordingly of the degree of grafting of the finished graft copolymer is familiar to any skilled worker and can for example be effected by controlling the feed rate of the monomers or by adding a regulator (Chauvel and Daniel, ACS Polymer Preprints 15 (1974), 329 et seq.). The emulsion graft copolymerization in general produces about 5-15% by weight, based on graft copolymer, of free nongrafted styrene polymer.

Depending on the conditions chosen for the preparation of the graft copolymer, a sufficient proportion of hard component may be formed during the graft copolymerization itself. In general, however, it is necessary to mix the product of the graft copolymerization with additional, separately prepared hard component.

For the purposes of the present invention, the soft component means that part of the impact-resistant polymer which is insoluble in toluene at room temperature (25° C.), minus any pigments. Accordingly, the soft component corresponds to the gel content of the product.

The mean particle size and particle size distribution were determined from the integral mass distribution, by the method of W. Scholtan and H. Lange, Kolloid-Z, und Z.-Polymere 250 (1972), 782–796, using an analytical ultracentrifuge. The ultracentrifuge measurement gives the integral mass distribution of the particle diameter of a sample. From this, it is possible to deduce what percentage by weight of the particles have a diameter equal to or less than a certan size. The mean particle diameter, also referred to as the $d_{50}$ of the integral mass distribution, is, for the purposes of the present invention, defined as the particle diameter.

The polyphenylene ethers are compounds based on ortho-disubstituted polyphenylene oxides, the ether oxygen of one unit being bonded to the benzene nucleus of the adjacent unit. The average molecular length should correspond to not less than 50 units. The polyphenylene ethers may contain halogen, hydrocarbon radicals which do not contain any tertiary hydrogen in the α-position, halohydrocarbon radicals, phenyl radicals and hydrocarbon-oxy radicals. Accordingly, suitable polymers include poly-(2,6-dichloro-1,4-phenylene)-ether, poly-(2,6-diphenyl-1,4-phenylene)-ether, poly-(2,6-dimethoxy-1,4-phenylene)-ether, poly-(2,6-dimethyl-1,4-phenylene)-ether and poly-(2,6-dibromo-1,4-phenylene)-ether. Preferably, poly-(2,6-dimethyl-1,4-phenylene)-ether is employed, more especially with an intrinsic viscosity of from 0.45 to 0.65 dl/g (measured in chloroform at 30° C.).

The polyphenylene ethers can, for example, be prepared from the phenols in the presence of complexing agents such as copper bromide and sec.-dibutylamine.

The mixtures of the impact-resistant styrene polymers and polyphenylene ethers can moreover contain other additives, such as pigments, dyes, fillers and flame-proofing agents, other compatible polymers, antistatic agents, antioxidants and lubricants.

The novel thermoplastic molding materials are obtained on mixing the soft and hard components and the polyphenylene ether. Usually, this is effected on an apparatus which permits homogeneous mixing, eg. a kneader, extruder or roll mill. The novel molding materials have not only good flow, but also good aging resistance and high heat distortion resistance.

In the Examples and Comparative Experiments, parts are by weight.

EXAMPLES AND COMPARATIVE EXPERIMENTS

Examples 1 to 4

Preparation of the Graft Copolymer

10 Parts of butyl acrylate and 0.6 part of tricyclodecenyl acrylate in 90 parts of water containing 0.7 part of Na $C_{14}$-alkylsulfonate and 0.2 part of potassium peroxydisulfate were heated to 65° C. in the course of 45 minutes, with stirring. When this temperature had been reached, a mixture of 50 parts of butyl acrylate and 1.8 parts of tricyclodecenyl acrylate was added in the course of 4 hours. Following this, the polymerization batch was stirred for 1 hour at 65° C. The solids content of the polymer dispersion obtained was about 41%. 60 parts of water, 0.08 part of dilauroyl peroxide and 0.08 part of potassium peroxydisulfate were added, and, in order to prepare the graft copolymer, 47 parts of styrene were then run in over 4 hours at 65° C., with stirring. The conversion, based on styrene, was virtually quantitative. The resulting graft copolymer dispersion was precipitated by adding a 0.75% strength aqueous calcium chloride solution. The solid product was separated off, washed with distilled water, filtered off and dried under reduced pressure at 80° C.

Comparative Experiments A to D

Preparation of the Graft Copolymer 10.4 Parts of butyl acrylate and 0.25 part of butanediol diacrylate in 90 parts of water containing 0.7 part of Na C$_{14}$-alkylsulfonate and 0.2 part of potassium peroxydisulfate were heated to 65° C. in the course of 45 minutes, with stirring. When this temperature has been reached, a mixture of 51 parts of butyl acrylate and 0.75 part of butanediol diacrylate was added in the course of 4 hours. Following this, the polymerization batch was stirred for 1 hour at 65° C. The solids content of the polymer dispersion obtained was about 41%. 60 Parts of water, 0.08 part of dilauroyl peroxide and 0.08 part of potassium peroxydisulfate were added, and, in order to prepare the graft copolymer, 47 parts of styrene were then run in over 4 hours at 65° C., with stirring. The conversion, based on styrene, was virtually quantitative. The resulting graft copolymer dispersion was precipitated by adding a 0.75% strength aqueous calcium chloride solution. The solid product was separated off, washed with distilled water, filtered off and dried under reduced pressure at 80° C.

The parts of graft copolymer, homopolystyrene of intrinsic viscosity 74 ml/g and poly-(2,6-dimethyl-1,4-phenylene)-ether shown in the Table, together with, in each case, 0.8 part of trinonylphenyl phosphite, were melted, homogenized, mixed and granulated, using a twin-screw extruder at 280° C. The poly-(2,6-dimethyl-1,4-phenylene)-ether had an intrinsic viscosity of 0.49 dl/g (measured in chloroform at 30° C.).

The Vicat softening point was determined by the method of DIN 53,460/B and the melt index by the method of DIN 53,735.

TABLE

| Examples | Graft copolymer [parts by weight] | Homo-polystyrene [% by weight] | Poly-(2,6-dimethyl-1,4-phenylene)-ether | Vicat softening point [°C.] | Melt index, 21.5 kg load at 250° C. [g/10 min] |
|---|---|---|---|---|---|
| 1 | 33.75 | 41.25 | 25 | 102 | 261 |
| 2 | 24.75 | 30.25 | 45 | 134 | 32.7 |
| 3 | 45 | 30 | 25 | 100 | 66.1 |
| 4 | 45 | 10 | 45 | 124 | 9.6 |
| Comparative Experiments | | | | | |
| A | 33.75 | 41.25 | 25 | 103 | 180 |
| B | 24.75 | 30.25 | 45 | 132 | 22.5 |
| C | 45 | 30 | 25 | 101 | 35 |
| D | 45 | 10 | 45 | 122 | 3.7 |

We claim:
1. A thermoplastic molding material comprising a mixture of
   (a) a polymer of a monomer selected from the group consisting of styrene, nuclear-alkylated styrene, sidechain-alkylated styrene and mixtures thereof, having an intrinsic viscosity of from about 40 to 140 ml/g, as the hard component,
   (b) a poly(alkyl acrylate), alkyl being of about 2 to 8 carbon atoms, which is prepared by crosslinking an acrylic ester with about 0.5 to 20% by weight of tricyclodecenyl acrylate having the formula (I)

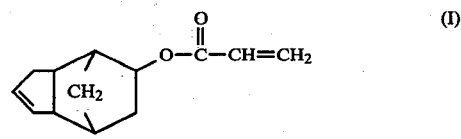

based on the comonomers employed, thereby preparing a grafting base, and grafting the crosslinked acrylic ester, to the extent of 10 to 60% by weight, solely with stryene, wherein said poly(alkyl acrylate) has a glass transition temperature of below 0° C., as the soft component and
   (c) a polyphenylene ether with an average chain length corresponding to not less than 50 benzene nuclei, the weight ratio a:b being (95–40):(5–60) and the weight ratio (a+b):c being (5–90):(95–10).
2. A thermoplastic molding material as claimed in claim 1, wherein the soft component (b) has a mean particle diameter of from 0.05 to 0.15 μm.

* * * * *

UNITED STATES PATENT AND TRADEMARK OFFICE
CERTIFICATE OF CORRECTION

PATENT NO. : 4,440,906

DATED : April 3, 1984

INVENTOR(S) : Franz Brandstetter et al

It is certified that error appears in the above-identified patent and that said Letters Patent is hereby corrected as shown below:

On the title page add:

--[30]  Jan. 24, 1981  [WG]  Fed. Rep. Germany ....... 31 02 253--

*Signed and Sealed this*

*Twenty-first* Day of *May 1985*

[SEAL]

Attest:

DONALD J. QUIGG

Attesting Officer     Acting Commissioner of Patents and Trademarks